T. L. BURTON.
BRAKE RIGGING RELEASE.
APPLICATION FILED JUNE 14, 1917.
1,261,485.
Patented Apr. 2, 1918.
2 SHEETS—SHEET 2.
-FIG. 3.-
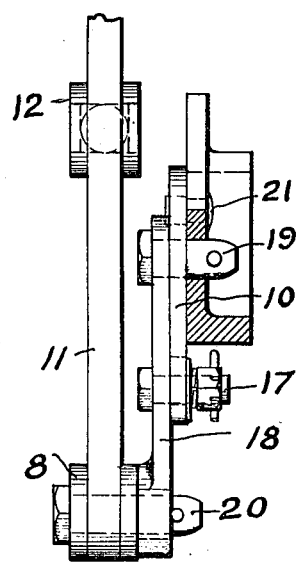
-FIG. 4.-
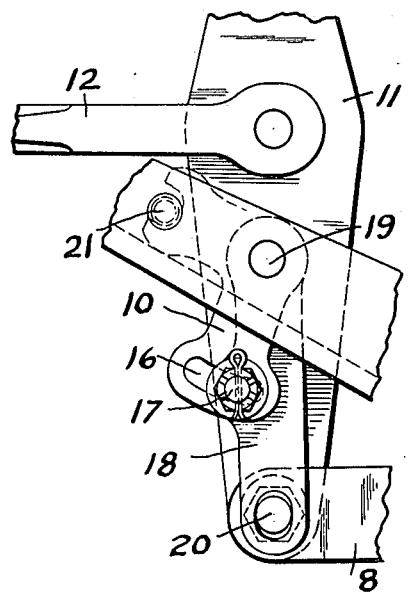
-FIG 5-
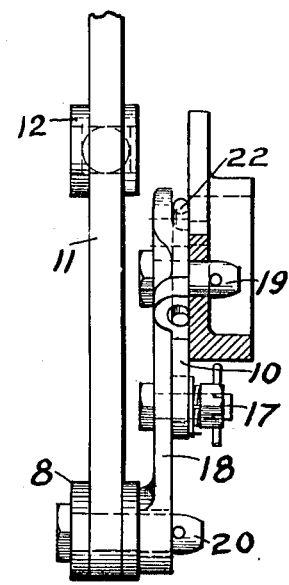
-FIG. 6.-
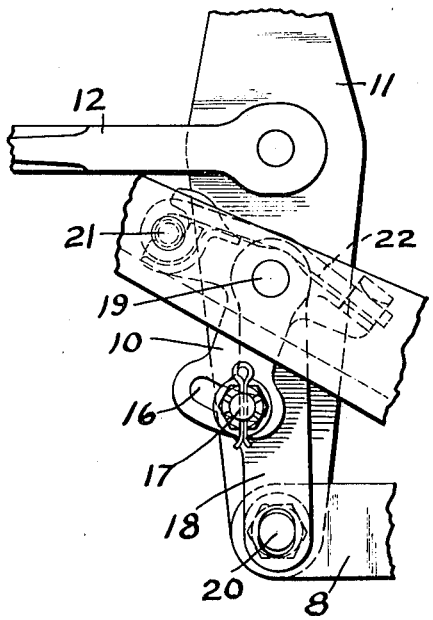
INVENTOR
Thomas L. Burton.
by Edward A. Wright.
Atty.

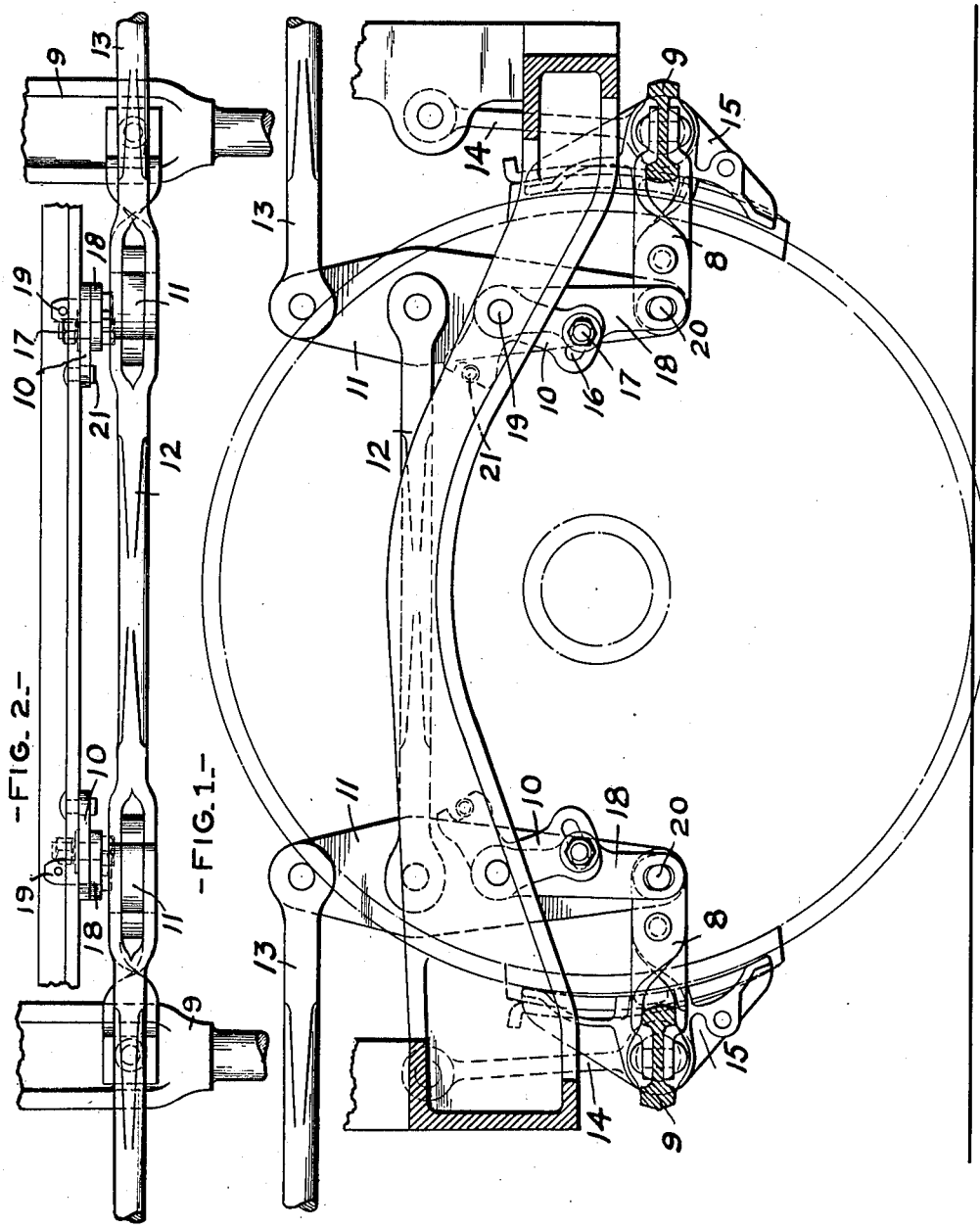

UNITED STATES PATENT OFFICE.

THOMAS L. BURTON, OF ST. LOUIS, MISSOURI, ASSIGNOR TO THE AMERICAN BRAKE COMPANY, OF ST. LOUIS, MISSOURI, A CORPORATION OF MISSOURI.

BRAKE-RIGGING RELEASE.

1,261,485.  Specification of Letters Patent.  Patented Apr. 2, 1918.

Application filed June 14, 1917. Serial No. 174,672.

*To all whom it may concern:*

Be it known that I, THOMAS L. BURTON, a citizen of the United States, residing at St. Louis, in the State of Missouri, have invented a certain new and useful Improvement in Brake-Rigging Releases, of which improvement the following is a specification.

This invention relates to brake rigging, and more particularly to the release action thereof, and has for its principal object to provide improved means for controlling and distributing the release movement through the system of brake rigging, so that the clearance between the wheels and brake shoes when released shall be substantially uniform for all the shoes. Another object is to provide improved means for suspending the brake beams and for controlling the release action, whereby the brake beams will maintain a substantially parallel relation during the swinging movement to and from the wheel, and be automatically adjusted to compensate for the wear of the brake shoes and wheels.

In the accompanying drawings,

Figure 1 is a longitudinal section taken between the truck wheels and showing a clasp type of brake rigging embodying my improvement;

Fig. 2, a plan of same;

Fig. 3, an end elevation of the lower portion of a truck lever and its connections with the truck frame;

Fig. 4, a side elevation of the same; and

Figs. 5 and 6, views similar to Figs. 3 and 4, respectively, but showing a slight modification.

My improvement may be employed with various forms of equalized brake systems, but is herein illustrated in connection with a brake rigging of the clasp type, in which there are brake beams 9, at both sides of each pair of wheels, with two sets of truck levers and rods, one at each side of the truck, the truck levers 11, being pivotally connected at their lower ends to the jaws 8, rigidly attached to the brake beams, and connected together by rods 12, at an intermediate point, and at their upper ends by rods 13, with levers of adjoining pairs of wheels, except at the ends of the truck where one truck lever may be attached to a fixed fulcrum on the frame, while at the opposite end a connection is made to a brake cylinder. The brake beams are shown in the form of I-beams having trunnions at their ends, and are suspended by hangers 14, connected to said trunnions and to the truck frame. The brake heads 15, may also be pivotally mounted on said trunnions.

According to my improvement a pivoted member, such as the arm 10, is mounted on the frame and is actuated upon its pivot by the movement of the brake beam or connections in applying and releasing the brakes. In the preferred construction, the arm 10, is provided with a slot 16, through which extends a bolt or pin 17, carried by a link or hanger 18, which may be mounted on the same pivot 19, on the frame as the arm 10, and at the lower end, connected to the same pivot pin 20, that joins the lower end of truck lever 11 to the jaw of the brake beam. The additional hanger 18, assists in supporting the brake beam and serves to maintain the beam in a substantially parallel relation as it swings to and from the wheel in the application and release movements. The pin or bolt 17, is provided with a nut and friction washer whereby the link 18, is clamped to the arm 10, with sufficient pressure so that the same move together in the normal operation of applying and releasing brakes. The arm 10, is preferably in the form of a bent lever having a certain limited free movement relative to the frame, and provided with a fixed stop 21 for preventing further movement of said lever arm 10, in either direction beyond the limit.

Upon release of brakes the usual release springs (not shown) operate through the system of rods and truck levers to swing the brake beams and shoes away from the wheels, and during this movement the lever 10, swings with the link 18, until the former strikes its stop 21, which limits the outward movement of said link and its brake beam. This distance is sufficient to furnish the proper amount of clearance between the brake shoes and wheels. If there should be a tendency, during this releasing action, to swing any particular brake beam through a greater distance from the wheel, this force reacting against the stop 21, will distribute the release movement through the system of rods and truck levers whereby all of the brake beams will be moved outward substantially the same distance, providing a uniform clearance between the brake shoes and wheels.

The free movement of the lever arm 10, is sufficient to allow for the normal application and release movement, but if owing to wear of the brake shoes or wheels it is necessary for any one of the brake beams to make a longer travel in order that the shoes may be brought up against the wheels with full pressure, the frictional resistance between the link 18, and arm 10, will be overcome and the pin 17 will be shifted along the slot 16 a sufficient distance to allow for this movement. This automatically takes up the excess of lost motion and compensates for the wear of the shoes and wheels, thereby maintaining the clearance substantially constant throughout the life of the brake shoes and under the various conditions of wear.

If desired, an individual release spring, such as indicated at 22, in Figs. 5 and 6, may be applied to each of the bent lever arms 10, this spring reacting between the stop 21 and the lever arm, whereby the spring tends to return the arm from its inward limit of movement, that is, when the brake shoe is against the wheel to the opposite limit during the release action, and thereby move the link 18 and with it the brake beam and shoes to the release position.

It will now be seen that my improvement not only operates to not only maintain a prompt and substantially constant and uniform release action of the brake shoes, but also furnishes an improved brake beam suspension and maintains the brake beams in a parallel horizontal position during the application and release movements.

Having now described my invention, what I claim as new and desire to secure by Letters Patent is:

1. In a brake rigging, the combination with the brake shoes and a set of truck levers and rods for actuating the same, of a member pivoted on the truck frame and actuated by the release movement of the rigging, and a stop for limiting the movement of said pivoted member.

2. In a brake rigging, the combination with brake beams, and truck levers and rods for actuating the same, of a pivoted lever arm operated by the release movement of a truck lever, and a stop for limiting the movement of said arm.

3. In a brake rigging, the combination with brake shoes, and a set of truck levers and rods for operating the same, of a movable member mounted on the truck frame and actuated by the application and release movements of a truck lever, and a stop for limiting the release movement of said member.

4. In a brake rigging, the combination with brake beams, and truck levers pivotally connected therewith, of a lever arm pivoted on the truck frame and having a positive connection actuated by the application and release movement of a truck lever, and a stop for limiting the release movement of said arm.

5. In a brake rigging, the combination with brake beams, and truck levers and rods for actuating the same, of a hanger for a brake beam, a movable member connected to said hanger, and a stop for limiting the release movement of said member.

6. In a brake rigging, the combination with brake beams, and truck levers and rods for actuating the same, of a hanger for a brake beam, a lever arm pivoted on the truck frame and connected to said hanger, and a stop for limiting the movement of said arm.

7. In a brake rigging, the combination with brake beams, and truck levers and rods for actuating the same, of a hanger for a brake beam, a lever arm pivoted on the frame and having a frictional connection with said hanger, and a stop for limiting the movement of said arm.

8. In a brake rigging, the combination with brake beams having jaws, and truck levers and rods for actuating the same, of hangers pivotally connected to said jaws, pivoted lever arms connected to said hangers, and stops for limiting the movement of said arms.

9. In a brake rigging, the combination with brake beams having jaws, and truck levers and rods for actuating the same, of hangers pivotally connected to said jaws, lever arms mounted on the same pivots as the hangers and connected to move therewith, and stops for limiting the movement of said arms.

10. In a brake rigging, the combination with brake beams, and truck levers and rods for actuating the same, of a hanger for a brake beam, a lever arm pivoted on the truck frame and provided with a slot, a bolt carried by the hanger and extending through said slot, a nut on the bolt for clamping the hanger and arm together, and a stop for limiting the movement of said arm.

11. In a brake rigging, the combination with brake beams, and truck levers and rods for actuating the same, of a hanger for a brake beam, a lever arm pivoted on the truck frame and connected to said hanger, a spring acting on said arm, and a stop for limiting the movement of said arm.

12. In a brake rigging, the combination of brake beams, truck levers pivotally connected to the brake beams, hangers attached to said beams on the same pivot with the truck levers, pivoted lever arms connected to said hangers, and stops for limiting the movement of said arms.

In testimony whereof I have hereunto set my hand.

THOMAS L. BURTON.